(12) United States Patent
Duluard et al.

(10) Patent No.: US 8,379,288 B2
(45) Date of Patent: Feb. 19, 2013

(54) TRANSPARENT ELECTROACTIVE SYSTEM

(75) Inventors: Sandrine Duluard, Charenton-le-Pont (FR); Jean-Paul Cano, Charenton-le-Pont (FR); Claudine Biver, Charenton-le-Pont (FR)

(73) Assignee: Essilor International (compagnie Generale d'optique), Charenton le Pont (FR)

( * ) Notice: Subject to any disclaimer, the term of this patent is extended or adjusted under 35 U.S.C. 154(b) by 0 days.

(21) Appl. No.: 13/122,019

(22) PCT Filed: Oct. 7, 2009

(86) PCT No.: PCT/FR2009/051911
§ 371 (c)(1),
(2), (4) Date: May 6, 2011

(87) PCT Pub. No.: WO2010/040954
PCT Pub. Date: Apr. 15, 2010

(65) Prior Publication Data
US 2011/0211245 A1 Sep. 1, 2011

(30) Foreign Application Priority Data
Oct. 9, 2008 (FR) ........................... 08 56837

(51) Int. Cl.
*G02F 1/03* (2006.01)
(52) U.S. Cl. .................. 359/245; 359/253; 359/254
(58) Field of Classification Search .............. 359/245, 359/254, 253
See application file for complete search history.

(56) References Cited

U.S. PATENT DOCUMENTS

| 6,597,489 B1 | 7/2003 | Guarr et al. |
| 2002/0005977 A1 | 1/2002 | Guarr et al. |
| 2006/0262377 A1 | 11/2006 | Kojima |

FOREIGN PATENT DOCUMENTS

| WO | 03/074627 | 9/2003 |
| WO | 2008/000607 | 1/2008 |

OTHER PUBLICATIONS

Kojima, Kyoko. "In-Plane switching electrochromic device using conductive polymers" *Polymer Preprints* (2005) pp. 523-524.
Monk, P.M.S., et al. "Electrochomism and Eiectrochromic Devices" *Cambridge University Press.* (2007) pp. 1-51.

*Primary Examiner* — Jack Dinh
(74) *Attorney, Agent, or Firm* — Occhiuti Rohlicek & Tsao LLP (57) ABSTRACT

The invention relates to a transparent electroactive system that includes two electrodes (2, 3) juxtaposed on the same side of a closed space (12) containing electroactive substances. The two electrodes are separated by a distance of less than 250 μm, and a barrier (1) extending towards the inside of the closed space is placed between the electrodes. The separation between the electrodes is thus not visible, and a mutual neutralization between the electroactive substances is prevented. Advantageously, the electroactive substances are contained in cells (5) separated from each other within the closed space. The barrier (1) can thus be distinct from separation walls (4) between the cells, or can be assimilated with some intercellular walls.

21 Claims, 4 Drawing Sheets

TRANSPARENT ELECTROACTIVE SYSTEM

CROSS-REFERENCE TO RELATED APPLICATIONS

This application is the National Stage of International Application No. PCT/FR2009/051911, filed on Oct. 7, 2009, which claims the priority of French Application No. 0856837 filed on Oct. 9, 2008, the contents of which are incorporated herein by reference in their entirety.

The present invention relates to a transparent electroactive system.

FIELD OF DISCLOSURE

It relates more particularly to such a system which incorporates electroactive substances having different redox potentials. Such substances, which are electrochemically active, may each be converted between an oxidized form and a reduced form, using an electric potential created at the location of this substance. These may be electrochromic substances, and the reader may refer about this subject to the following document: P. M. S. Monk, R. J. Mortimer and D. R. Rosseinsky, Electrochromism and electrochromic devices, 2007, Cambridge University Press.

BACKGROUND OF THE INVENTION

It is known to produce from such substances, transparent systems with light transmission characteristics which can be modified using an electrical signal. To this purpose, the electroactive substances are chosen depending on their redox potential, and on a light absorption and/or color variation between their oxidized and reduced forms. Thus, the light transmission of the system and/or its color can be modified by the electrical command.

The electrical command is an electrical potential difference or a current which is applied between two electrodes which contact a medium containing the electroactive substances. This medium is a liquid and/or a gel, so that the electroactive substances can each diffuse or migrate towards one of the electrodes. When a first one of the substances comes into contact with the electrode having the higher potential, it is oxidized. Simultaneously, a second substance coming into contact with the electrode having the lower potential is reduced. The two substances are therefore oppositely converted relative to the oxidized and reduced forms, and the overall variation in the light transmission and/or color of the system results from the individual variations in adsorption and/or color of each substance between its oxidized and reduced forms.

The two electrodes are transparent. They may be based on indium tin oxide (ITO), or based on tin oxide doped, for example, with fluorine (FTO for fluorine tin oxide), based on a sufficiently thin metal film, or on an invisible metallic mesh, etc.

The two electrodes may be placed on two opposite sides of a volume which encloses the medium with the electroactive substances. But in such a system configuration, a given light ray, transmitted through the system, passes through one of the electrodes, through the electroactive-substance-containing medium and then through the other electrode. The respective residual light absorptions of the two electrodes are therefore cumulative, causing a reduction in the light transmission of the system. Materials currently used for the electrodes have light absorptions that are perceptible, and which make the system too dark for certain applications.

According to a possible alternative electroactive-system configuration, the two electrodes may be juxtaposed on just one side of the medium containing the electroactive substances. But systems produced according to this alternative configuration are not completely transparent. They may scatter or diffract light due to the index difference between the material of the electrodes and the material present in the gaps separating these electrodes. In addition, if the distance separating the two electrodes is large, the gap separating these electrodes becomes visible due to the different light absorptions of the materials forming these electrodes and those forming the gap.

Conversely, if the distance separating the two electrodes is small, a strip may appear between the latter, in which the electroactive substances reciprocally neutralize one another. Such neutralization causes a progressive bleaching of the system. This is because the substances which have reacted on one of the two electrodes diffuse or migrate towards the other electrode, and react with the substances arising from the latter.

SUMMARY

One object of the present invention is therefore to provide electroactive systems that are transparent, and which do not have the aforementioned drawbacks.

To this end, the invention provides a transparent electroactive system that allows clear vision through this system, and which comprises:
- external walls which define a closed volume, the system being transparent for a direction of sight through the external walls and the closed volume between two opposite sides;
- a liquid and/or a gel which is contained in the closed volume;
- two transparent electrodes, which are in contact with the liquid or gel on electron transfer surfaces, and which are intended to be respectively connected to two terminals of a variable power supply;
- first and second electroactive substances, which are distributed in the liquid or gel, with different respective redox potentials, at least some of the first and second electroactive substances having an optical effect variable between an oxidized form and a reduced form of these substances.

The system of the invention is characterized in that the two electrodes are borne by a same one of the two external walls, being juxtaposed parallel to this wall on a same one of the sides of the closed volume which contains the liquid or gel, with a separation distance between these electrodes which is less than 250 μm (microns).

In addition, the system furthermore comprises a barrier which extends between the two electrodes, to a height h which may depend on the mobility of the substances, on the electric field applied to the latter, and on the geometry of the system. Generally, this height, measured from a mean level of the electron transfer surfaces of the two electrodes, lies between 1 and 20 μm (microns).

Thus, a system according to the invention is both transparent and has a configuration in which the two electrodes are on the same side of the volume which contains the electroactive substances. By virtue of this configuration, a given light ray passes through only one of the two electrodes instead of both of them. The system may then exhibit a high light transmission.

In the context of the present description, the term "transparency" is understood to mean that it is possible to clearly see any object or scene that is located on one side of the system, from the other side, through this system. In other words, the light which passes through the system is not affected in a way which could blur viewing. In particular, it is not scattered or diffracted, so that a point light source which is located at a distance from the system on a first side of the latter is perceived as a point through the system, from the other side.

Moreover, the two electrodes are sufficiently close to each other, parallel to the common wall which bears them, that the gap separating these electrodes is not visible to the naked eye. In this way, a system in which the invention is implemented is a esthetic, and may be used for many applications, in the optical, ophthalmic and especially architectural fields. Preferably, the distance separating the two electrodes may be less than 100 µm, even between 1 and 40 µm, so as to be still less visible.

Finally, the invention provides for a barrier to be placed between the two electrodes, in the gap separating the latter, which barrier extends towards the interior of the volume containing the electroactive substances. By virtue of this barrier, of a sufficient height, diffusion or migration of the electroactive substances from one electrode to another is inhibited or reduced, so that no significant reciprocal neutralization of the electroactive substances reduced or oxidized on one or other of the two electrodes takes place. Thus, the system does not exhibit an intermediate strip, between the two electrodes, in which the optical variation cannot be voluntarily controlled. In other words, the effective area of the system, which actively produces the variation in light transmission and/or color, is increased. The system may then have higher apparent contrast. Preferably, the height of the barrier may be greater than or equal to 5 µm beyond the mean level of the electron transfer surfaces of the two electrodes. Residual diffusion or migration of the electroactive substances between the two electrodes, likely to result in residual neutralization of the substances which have been oxidized or reduced at the electrodes, is then even further reduced.

A first advantage of the invention results from the liquid- or gel-state of the medium in which the electroactive substances are dispersed. By virtue of this state, the electroactive substances may diffuse or migrate more rapidly towards one or other of the two electrodes, so that the system exhibits a short response time to a switching signal, which is applied by varying the voltage delivered by the power supply. This liquid- or gel-state of the medium also simplifies the process for manufacturing the system.

A second advantage results from the configuration with two electrodes which are borne by just one wall. By virtue of this configuration, the system may be produced more simply and with fewer processing steps. In particular, the two electrodes may be produced simultaneously, with common deposition and etching steps. In addition, it is no longer necessary to align the two external walls one relative to the other during assembly of the system.

According to an improvement to the invention, the system may furthermore comprise a network of internal walls which forms a partition of the closed volume into cells juxtaposed parallel to the external walls. At least one of the two electrodes is then in contact with the liquid or gel which is contained in each cell. By virtue of such partitioning of the volume enclosed between the two external walls, the liquid or gel, which contains the electroactive substances of the whole system cannot flow out of the system when one of the cells becomes opened. Only the amount of liquid or gel that is contained in the open cell may then leak out, so that the integrity and the functionality of the system are preserved for all the cells other than the opened cell. In particular, such partitioning allows the system to be cut without damage, other than along the path of the cut.

Furthermore, the internal walls may have a spacer function, maintaining a constant distance between the external walls. When the system is oriented vertically, they especially prevent the external walls from separating at the bottom under the effect of the hydrostatic pressure of the liquid or gel. Optionally, the internal walls also prevent decantation within the liquid or gel.

The internal walls may each have a height which is greater than or equal to the height of the barrier, preferably between 5 µm and 25 µm, perpendicular to the external walls. Indeed, such a thickness of the medium which contains the electroactive substances, allows a substantial contrast to be obtained between two extreme switching states controlled by the voltage variation that is applied between the two electrodes.

According to a first preferred embodiment of the invention, for at least some of the cells, the two electrodes are each in contact with the liquid or gel which is contained in each cell, with a portion of the barrier which is placed in the cell between the two electrodes. The liquid or gel contained in the cell then contains both the first and the second electroactive substances. Each cell is then independent of the others, relative to the operation of the system during an electrically controlled switching. In this case, each cell may be hermetically sealed so as to isolate it from the other cells, thus preventing a chemical alteration from propagating between adjacent cells.

According to a second preferred embodiment of the invention, for at least some of the cells, only one of the two electrodes is in contact with the liquid or gel which is contained in each cell. A first one of these cells, which is powered by one of the electrodes, is then adjacent a second one of these cells, which is powered by the other electrode. The system then comprises a salt bridge, between the two cells, which ensures that electrical charge is balanced for each individual cell. The internal wall which separates the two adjacent cells, each powered by a separate electrode, then forms a portion of the barrier, between the two electrodes, provided by the invention. In this case, this barrier portion extends from one external wall of the system to the other, and has a height which is even greater than 3 µm, preferably greater than 5 µm. The two electrodes have edges which are respectively located in the two adjacent cells, and which are still separated by at least 150 µm, preferably by at least 100 µm, even more preferably by a distance of between 5 and 40 µm.

When a high optical contrast is desired between the different states of the system controlled by the voltage applied across the two electrodes, the first and second electroactive substances may each have an optical effect which is variable between the oxidized form and the reduced form of these substances.

In particular, the first and second electroactive substances may have respective colors, in at least one of the oxidized or reduced forms, in a way which is complementary relative to these forms, so that these colors appear simultaneously when the system is operated. In this case, the two electrodes may advantageously be alternated with a pitch such that the complementary colors cannot be distinguished at the viewing distance of the system. A uniform average color is then perceived.

According to another improvement to the invention, the system may furthermore comprise a strip of a transparent and insulating material, which is placed between the two electrodes. This strip and the electrodes may have respective optical thicknesses which are designed to produce respective phase delays which are equal for a wave of visible light propagating at right angles to the electron transfer surfaces of the electrodes. In this way, scattering or diffraction of the light, that the edges of the electrodes or the gap separating the latter could cause, is reduced or prevented. The transparency of the system is thus increased.

Alternatively, and also with the aim of increasing the transparency of the system, the system may also comprise an amount of a substance, which is absorbing for a part at least of the visible light, placed between the two electrodes. This amount of absorbing substance is preferably borne by the same external wall as the electrodes, and on the same side as the latter.

Also with the aim of increasing the transparency of the system, the form of the gap separating the electrodes may be irregular so as to average in space the scattering or diffraction that the ordered arrangement of the electrodes causes. The expression "irregular form" is understood to mean a form that is neither rectilinear nor has a repeating pattern consisting of less than four rectilinear segments. The form of the barrier may be similar to that of the gap. The form of the walls will advantageously also possibly be irregular so as to further reduce the scattering or diffraction caused by the walls.

These various improvements increase the transparency of the system. They also allow the gap separating the electrodes to be increased while preserving a high transparency.

A transparent electroactive system according to the invention may be employed in very different applications. In particular, it may form a glazing pane, for example a glazing pane for front face of a building, an ophthalmic spectacles lens, a helmet visor or a mask lens.

Other features and advantages of the present invention will be made clear in the description below of nonlimiting exemplary embodiments, with reference to the appended drawings, in which:

DETAILED DESCRIPTION

To make these figures clear, the dimensions of the elements shown correspond neither to the actual dimensions nor to ratios of actual dimensions. Furthermore, identical references in different figures denote identical elements or elements which have identical functions.

In addition, the embodiments of the invention that are described in detail pertain to the ophthalmic field. But it is understood that this field of application is taken only by way of example, and that the invention may be similarly employed in different fields of application.

Figure 1:
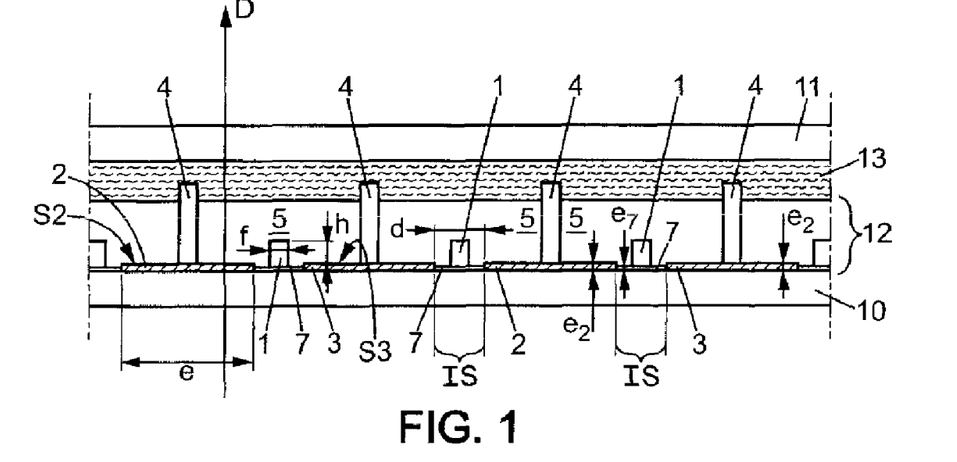
FIGS. 1 and 2 are cross sections of systems according to the invention, corresponding respectively to two separate configurations.
Figure 2:
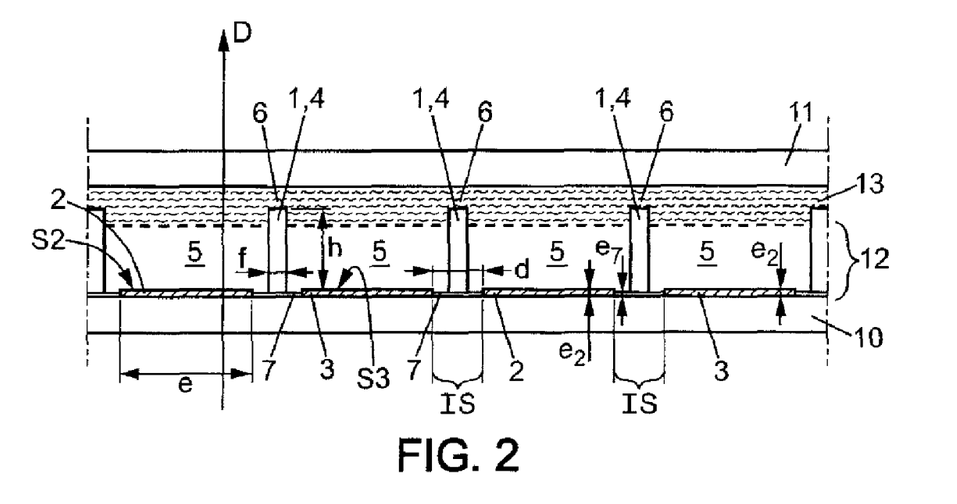

In accordance with FIGS. 1 and 2, two external walls 10 and 11 define between them a closed volume 12. The walls 10 and 11 are parallel to each other, flat or curved, and have any area. For example, the wall 10 may be a transparent organic film, a spectacles lens, or a spectacles blank, and the wall 11 may be a transparent organic capping film. In this case, the wall 10 may be made of any transparent organic or inorganic material that is currently used in the ophthalmic field. The wall 11 may be made of polyethylene terephthalate (PET), cyclic olefin copolymer (COC), triacetyl cellulose (TAC) or polycarbonate (PC), for example. Furthermore, the wall 11 may be placed on a concave side of the spectacle lens that forms the wall 10. The thickness of the wall 11 may be suited to the method that is used to assemble it with the lens 10. For example, it may be between 50 and 200 µm. In addition, the walls 10 and 11 may each be complex structures. Especially, they may each comprise a base wall element and one or more coatings which are placed on the latter in order to confer additional properties to it. By way of nonlimiting example, these coatings may have an antireflection function, an antisoiling function, a mechanical protection function, a UV protection function, or a gas barrier function, etc.

When the wall 10 or the wall 11 is a transparent organic film, the stack may be transferred onto an organic or inorganic substrate. In this case, the wall or alternatively the wall 11 may be placed in contact with the substrate.

The wall 10 bears two separate electrodes 2 and 3 on its side which is oriented towards the volume 12. These electrodes may be made of any electrically conductive material known to a person skilled in the art. For example, they may be made of ITO. The electrodes 2 and 3 may have respective patterns that are complementary relative to the area of the wall 10, so as to cover all of the wall except for a gap IS separating these electrodes. The gap IS electrically isolates the two electrodes from each other, on the wall 10. For example, the electrodes 2 and 3 may have respective comb patterns which are interlaced, one in the other.

Figure 3A:
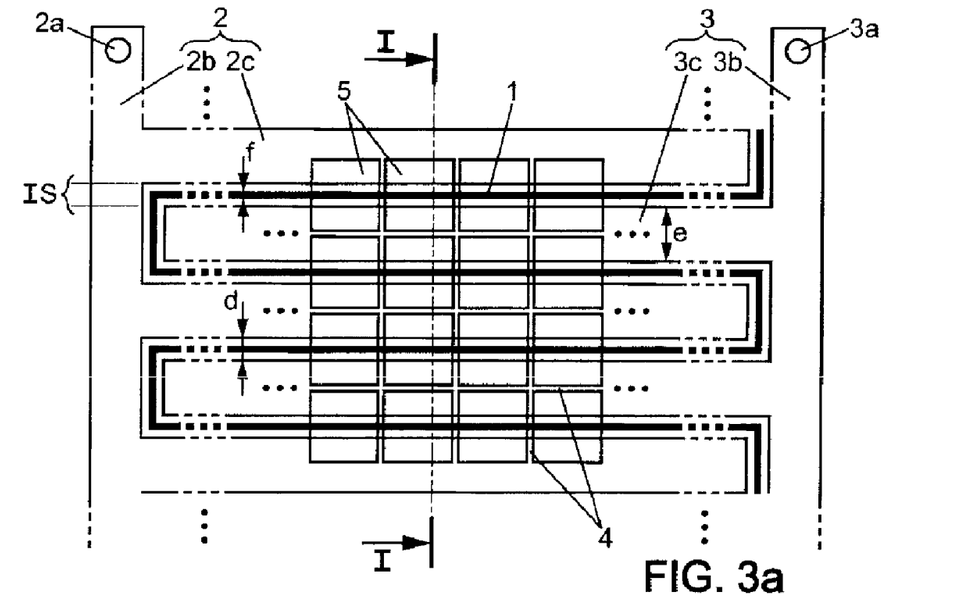
FIGS. 3a and 3b are plan views of systems according to the invention showing possible electrode contours for a system in accordance with FIG. 1.

FIGS. 3a/4a and 3b/4b respectively show two possible patterns for the electrodes 2 and 3. In these figures, the references 2a and 3a denote terminals for connecting the electrodes 2 and 3, respectively, to output terminals of a power supply (not shown), which is used to control the system and to supply it with current.

Figure 4A:
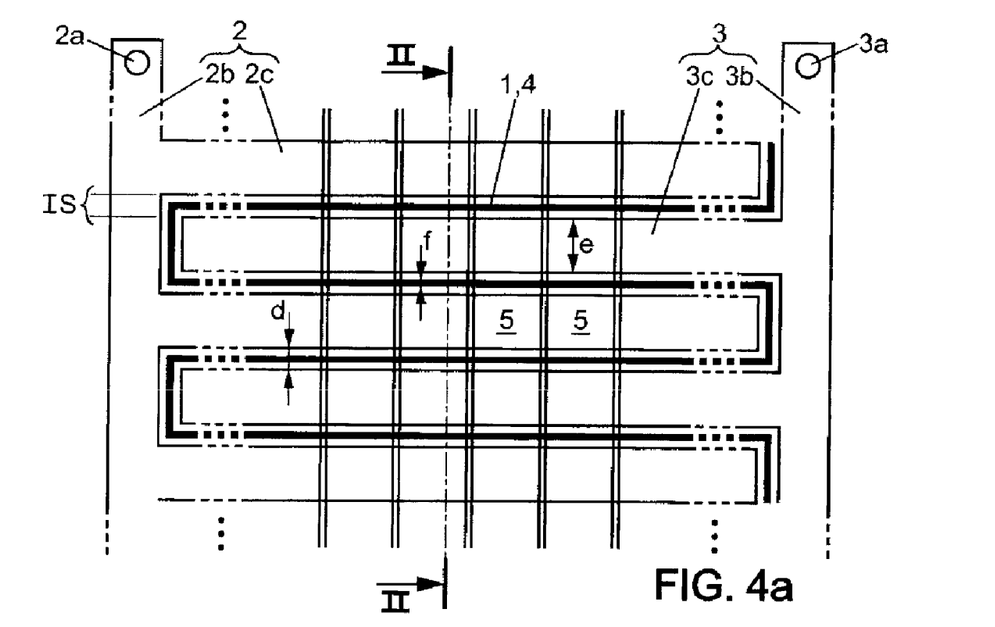
FIGS. 4a and 4b are plan views of systems according to the invention, showing possible electrode contours for a system in accordance with FIG. 2.

The pattern of FIGS. 3a and 4a is rectilinear. Each electrode 2, 3 comprises a base branch, respectively 2b and 3b, and respective prolongations 2c and 3c which are connected to the corresponding base branches. The prolongations 2c and 3c are alternated in a direction parallel to the base branches 2b and 3b, so as to completely cover the wall 10 except for the gap IS.

Figure 3B:
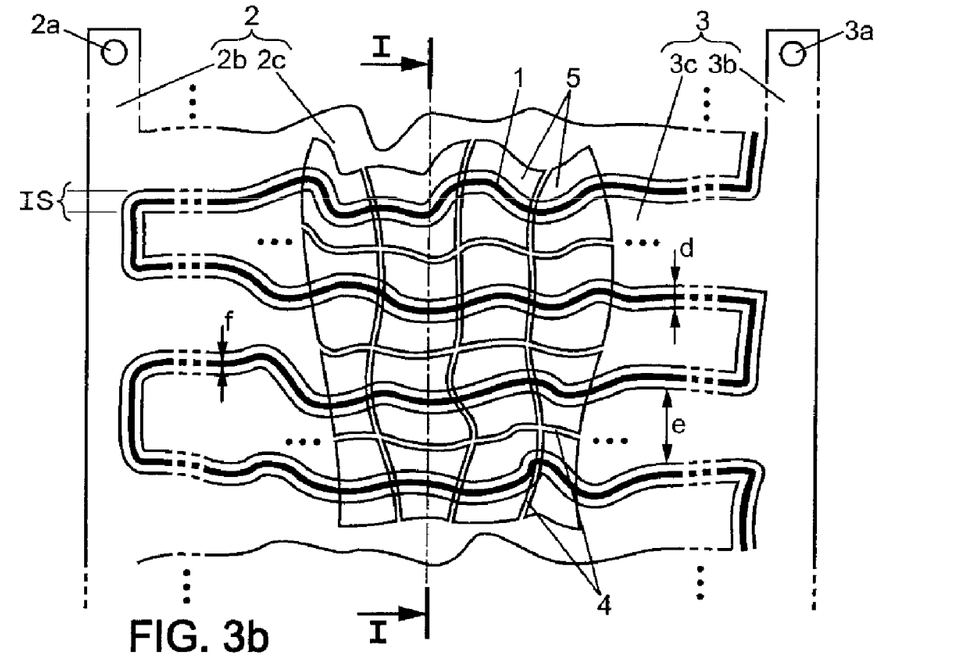
Figure 4B:
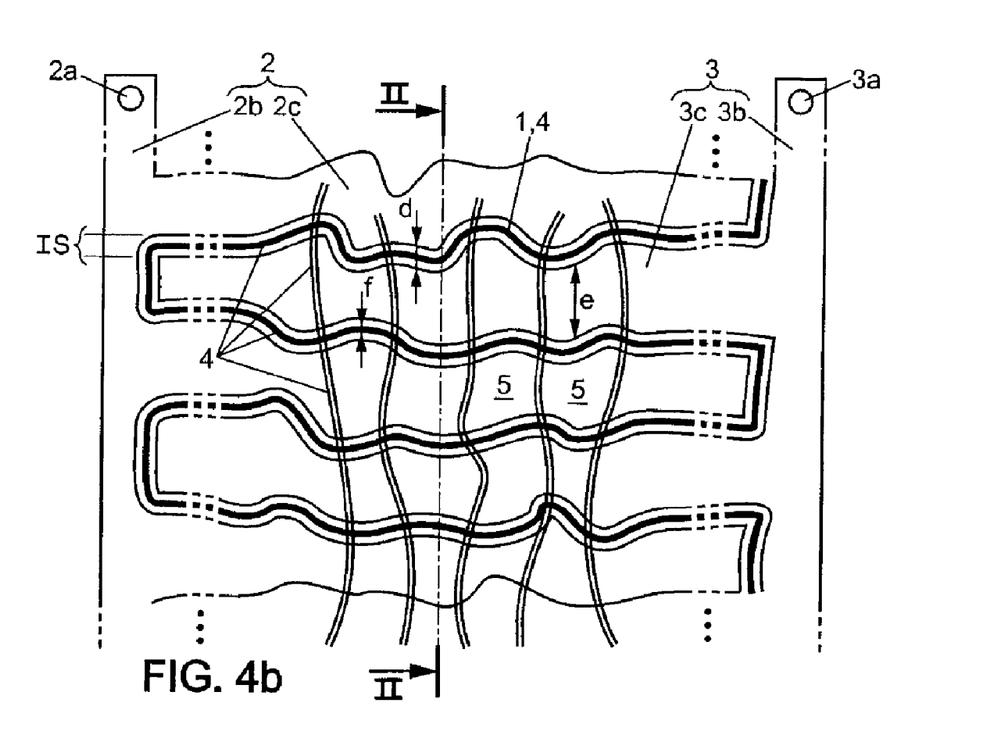

The pattern in FIGS. 3b and 4b is irregular. In other words, the electrodes 2 and 3 have irregular contours, parallel to the external walls 10 and 11. Such irregular contours prevent a substantial amount of light from being diffracted by the contours of the electrodes in particular directions. In this way, no flicker is observed when the system is pivoted relative to an external viewer or when the eye of the wearer of the spectacle lens looks in different directions through the lens. Preferably, the contours of the electrodes 2 and 3 may have two-dimensional irregularities, parallel to the walls 10 and 11. The expression "two-dimensional irregularities" is understood to mean irregularities in all directions parallel to the walls 10 and 11. The barrier 1 is aligned with respect to the irregular pattern of the electrodes. The form of the walls 4 will advantageously be structured irregularly so as to further reduce the scattering or diffraction that is caused by the walls. Flicker may thus be reduced or prevented for all the deflections that a light ray passing through the system could experience.

The width d of the gap IS separating the electrodes 2 and 3 may be constant, and between 1 and 40 µm. For example, it may be substantially equal to 20 µm.

The width e of the prolongations of the electrode $2c$ and $3c$ may be between 10 and 5000 µm. For example, it may be on average about 50 to 500 µm.

The electrodes 2 and 3 may have the same thickness $e_2$, perpendicular to the wall 10, for example 0.3 µm.

Optionally, a strip 7 of a transparent material may be placed in the gap IS between the two electrodes 2 and 3, with a thickness perpendicular to the wall 10 which depends on that of the electrodes. In this way, the electrodes 2 and 3 with the strip 7 may produce a phase delay which is uniform over the wall 10 for light rays that pass through the system 10 through one or other of the electrodes or through the gap IS. In FIGS. 1 and 2, D represents a path for light rays that pass through the system of the invention between two opposite sides of the latter. D may or may not be perpendicular to the walls 10 and 11. The strip 7 makes it possible to reduce the intensity of light that would be scattered or diffracted by the edges of the electrodes 2 and 3. For example, the strip 7 may be made of titanium oxide ($TiO_2$) or alumina ($Al_2O_3$), and the thickness $e_7$ of the strip 7 may be determined using the formula $\Delta n_7 \times e_7 = \Delta n_2 \times e_2$ where $\Delta n_7$ and $\Delta n_2$ denote differences between the refractive index of the material of the strip 7 and that of the electrodes 2, 3, respectively, relative to the medium in the volume 12.

Figure 5A:
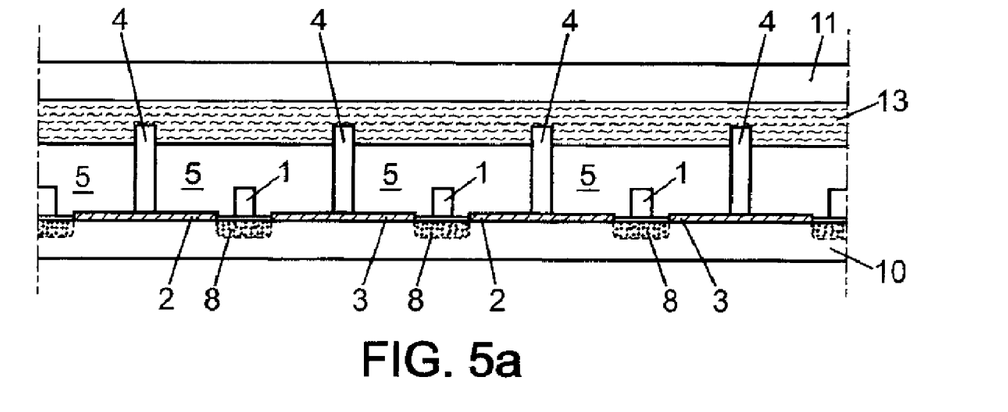
FIGS. 5a and 5b are enlarged views respectively in accordance with FIGS. 1 and 2, which show an alternative embodiment with an improvement to the invention.
Figure 5B:
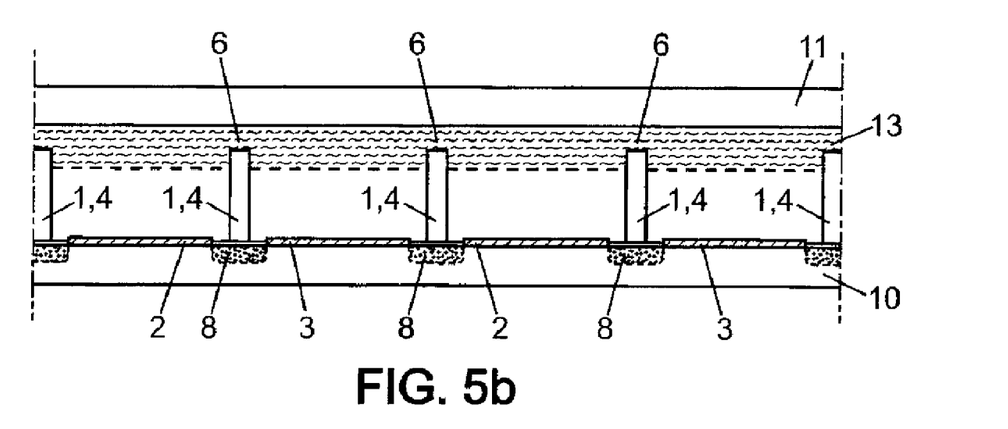

Alternatively, the system may also comprise an amount of a substance that is absorbing for a part at least of the visible light, and which is placed in the gap IS between the electrodes 2 and 3. Such a substance also reduces the light capable of being scattered by the edges of the electrodes 2 and 3. Advantageously, such an absorbing substance may be black. According to an economical method of introducing the absorbing substance into the system, it may be one or more dyes that preferentially diffuse into the wall 10 between the electrodes 2 and 3. Such an amount of absorbing substance is referenced 8 in FIGS. 5a and 5b.

Electroactive substances are contained in the closed volume 12 so as to form a reversible electrochemical system with the electrodes 2 and 3. In a known manner, these substances must belong to at least two separate electrochemical couples, which are associated with different oxidation potentials. Thus, first substances belong to a first electrochemical couple, and each has an oxidized form and a reduced form. Each of these first substances is converted from its reduced form to its oxidized form when it contacts that of the two electrodes 2 and 3 which is connected to the positive terminal of the power supply. It is subject to the opposite conversion when it contacts, in its initially oxidized form, the electrode which is connected to the negative terminal of the supply. When the two oxidized and reduced forms have light absorption properties or colors that are different, each of these conversions causes a variation in the light transmission or color of the system at the corresponding electrode.

Similarly, second substances belong to a second electrochemical couple, which also each has an oxidized form and a reduced form. The behavior of this second couple is identical to that of the first. When the voltage which is applied across the electrodes 2 and 3 is greater than the difference between the oxidation potentials of the two couples, the oxidized substances of the couple which has the lowest oxidation potential reacts with that of the two electrodes 2 or 3 which is connected, at a given moment, to the negative terminal of the power supply. The reduced substances of the other couple react with the other electrode. The system thus produces the optical switching which is controlled by the voltage delivered by the power supply.

When the voltage which is applied between the electrodes 2 and 3 is removed, the substances of the two couples react together and spontaneously return to their respective initial, oxidized and reduced, forms so that the system recovers its initial optical aspect. The opposite optical switching is obtained.

The first and second electroactive substances may be chosen from electrochemical couples known to a person skilled in the art. By way of nonlimiting example, these may be electrochromic substances such as viologens, carbazoles, compounds based on phenylenediamine, compounds based on quinone, compounds based on naphthopyran, etc. They may be dispersed in a liquid or a gel which fills the volume 12, and which ensures that these substances are able to move so as to react electrochemically on one or other of the electrodes 2 and 3. This dispersion medium may be a solvent of both the oxidized and reduced forms of the two electrochemical couples. For example, when the first electroactive substances are ethyl viologen perchlorate (0.2M) and the second electroactive substances are N,N,N',N'-tetramethylphenylenediamine (0.2M), the dispersion medium may be based on propylene carbonate.

The substances of the two electrochemical couples may each have an optical effect which is variable between their respective, oxidized and reduced, forms. In this case, the optical switching of the system is the combination of the respective optical variations of the two electrochemical couples, in the oxidation direction for one of the couples and in the reduction direction for the other. In particular, the substances of one of the couples may be colored for one of their oxidized or reduced forms, and the substances of the other couple may be colored for the other oxidized or reduced form. In this case, these colors appear or disappear simultaneously, depending on the electrical command which is applied to the system via the electrodes. When they appear at the same time, respectively at the corresponding electrodes, the apparent color of the system may be perceived as being uniform when the electrodes are interlaced and alternated with a sufficiently fine pitch. In particular, the pitch of the alternation of the electrodes may be selected depending on the distance between a viewer and the system. The apparent color is the mixture of the actual colors of each colored substance.

Optionally, the substances of the two couples which appear and disappear at the same time at the respective electrodes may have colors which are substantially identical.

Alternatively, the first or the second electroactive substances, belonging to one of the couples, may have an optical effect which is variable between their oxidized form and their reduced form, whereas the other substances, which belong to the other couple, are not optically variable between their oxidized form and their reduced form. In this case, that of the electrodes 2 or 3 which is dedicated to transferring electrons to the substances which are not optically variable has an electron transfer surface that is smaller than that the electron transfer surface of the other electrode, the latter then being dedicated to exchanging electrons with substances that are optically variable. Thus, the area of the wall 10 may be used to obtain a high optical contrast between switching states despite one of the two couples not being optically variable.

The barrier which is placed between the electrodes according to the invention is referenced 1 in the figures. It extends into the volume 12 between the electrodes 2 and 3, from the side of the wall 10 which is internal to the system or from the strip 7 when the latter is present. The height and the thickness of the barrier 1 are respectively denoted h and f. The thickness f may be greater than or equal to 0.1 µm, for example between 0.5 and 8 µm.

The respective electron transfer surfaces of the electrodes 2 and 3 are parallel to the wall 10. They are denoted respectively S2 and S3 in FIGS. 1 and 2. Most often, they are located on just one level above the side of the wall 10 which bears the two electrodes, corresponding to the thickness $e_2$ of the electrodes. In this case, the height h of the barrier 1 is measured from the common level of the electron transfer surfaces of the two electrodes 2 and 3. In the general case, especially if the electron transfer surfaces are not on just one common level above the wall 10, the height h is measured from a mean of the respective levels of the electron transfer surfaces of the electrodes.

The barrier 1 increases the distance, for the electroactive substances within the liquid or gel, between the electrodes 2 and 3 and reduces their electromigration. By virtue of this increase, the substances of each couple which have reacted at one or other of the two electrodes are not able to meet one another until after a greatly increased diffusion or migration time. In practice, depending on the height h of the barrier 1, this time may be much longer than that which separates successive commands to switch between two opposite switching states of the system. Thus, the reciprocal neutralization of the substances of the two couples which have been reduced or oxidized at the respective electrodes is prevented. The system therefore exhibits no strip, between the two electrodes, the coloration of which does not correspond to the electrically controlled state. Furthermore, the current consumption of the system is also reduced.

Moreover, in the preferred embodiments of the invention which are described here, the volume 12 is divided into cells 5 by a network of internal walls 4. The walls 4 extend into the interior of the volume 12, from the external wall 10, or from components which may be borne by the latter. The walls 4 may especially be borne by one or other of the electrodes 2 and 3, or by the strip 7 when the latter is present in the system. The internal walls 4 may each have a height of 1 to 50 µm, and preferably of 5 to 25 µm, perpendicular to the wall 10, and a thickness of about 0.5 µm. The network of walls 4 forms a partition of the volume 12, so that the liquid or gel which contains the electroactive substances is distributed and enclosed in the cells 5. An appropriate amount of the liquid or gel, with a controlled composition, is then introduced, either uniformly into all the cells 5 by lamination for example, or individually into each cell 5, for example by using a material projection head such as an inkjet head. The cells 5 are then capped by the external wall 11, on the side opposite the wall 10. To this purpose, a film 13 of an adhesive may be placed between the external wall 11 and the tops of the internal walls 4. The thickness of the film 13 is chosen so as to ensure good adhesion. The film 13 may have a thickness of 8 to 15 µm for example, and be made of polystyrene (PS), polyacrylonitrile (PAN), polyvinylidene fluoride (PVDF), polymethylmethacrylate (PMMA), polyurethane (PU), etc.

The barrier 1, and the internal walls 4, may be based on at least one organic, inorganic or hybrid material. This material may be deposited on the external wall 10, especially by embossing, screen printing, inkjet printing, spin coating or spraying, followed by an etching step. This may be for example silica ($SiO_2$) or alumina ($Al_2O_3$). Alternatively, the barrier 1 and the internal walls 4 may be made of a photoresist.

The system is then fabricated by carrying out the following steps on the external wall 10, in chronological order: electrodes 2 and 3 are formed, strips 7 or 8 are optionally formed, the barrier 1 and internal walls 4 are formed, and cells 5 are filled. Then, the walls 10 and 11 are assembled with each other so as to close the completed system.

According to two different configurations of a system according to the invention, the barrier 1 may be separate from the internal walls 4, or coincide with some of the walls 4. But it is understood that, generally, the use of the barrier 1 according to the invention is independent of the use of internal walls 4 to divide the volume 12 into juxtaposed cells.

The first configuration, according to which the barrier 1 is separate from the internal walls 4, is shown in FIGS. 1, 3a, 3b and 5a. The height h of the barrier 1 may be, for example, 5 µm, and the height of the walls 4 may be 20 µm. In this first configuration, each cell 5 contains both a portion of the electrode 2 and a portion of the electrode 3, and a portion of the barrier 1 between the two electrode portions. The liquid which is contained in each cell 5 simultaneously contains the substances of each of the two electrochemical couples. Thus, each cell 5 is independent of the others, and all the cells may operate in parallel in response to the same voltage applied between the two electrodes. The cells 5 may then each be hermetically sealed, so that no material may pass between adjacent cells. For example, the film may be made of a pressure-sensitive material, commonly called a PSA for pressure-sensitive adhesive, which adheres both to the external wall 11 and to the tops of the internal walls 4.

In the second configuration, the barrier 1 coincides with some of the internal walls 4, as shown in FIGS. 2, 4a, 4b and 5b. The walls 4, which are concerned, then form portions of the barrier 1. In this case, the height h of the barrier 1 is that of the walls 4. In this second configuration, each cell 5 contains only a single electrode portion, belonging either to the electrode 2, or to the electrode 3. In addition, each cell, which contains a portion of one of the electrodes, is adjacent at least one other cell, which contains a portion of the other electrode. When the system is switched, the two cells operate in a complementary manner, like an electrical battery. Under these conditions, each cell 5 may contain substances of just one of the two electrochemical couples, or else both, especially depending on the respective polarities applied to the two electrodes 2 and 3. Two adjacent cells, one powered by the electrode 2 and the other one by the electrode 3, are then connected together electrically by a salt bridge 6. The electrical behavior and the composition of such a salt bridge are presumed known to a person skilled in the art. The salt bridge 6 may either be permeable to all the electroactive species and to the ionized species of the electrolyte, or impermeable to the first and second electroactive substances. In this second case, the electroactive substances may each be contained permanently in one of the adjacent cells. In this way, each cell may not contain substances belonging to the electrochemical couple which is not activated by the electrode which powers it. A saving in electroactive substances results therefrom.

According to a first variant, the salt bridge 6 may be formed by a film of a gel or a membrane which is placed on the tops of the internal walls 4, on the side opposite the electrodes 2, 3. Such a film, which forms the salt bridge 6, has a thickness which especially depends on the height of the internal walls 4. This thickness may be about 10 µm, for example, perpendicular to the walls 10 and 11. Optionally, this gel may also form the film 13 which ensures the cohesion of the system by securing the walls 10 and 11 to each other.

According to a second variant, the internal wall 4 which separates two cells 5, one powered by the electrode 2 and the other one by the electrode 3, may form the salt bridge. To this purpose, this wall may be porous and permeable to ions, so as to allow the latter to transfer between the two cells. In this case, the seal above the walls 4 may be hermetic, so that the seal itself allows neither electroactive substance nor ionic species of the electrolyte to pass through.

The two variants, of the salt bridge 6 formed above the walls 4, and of the salt bridge which is formed by the wall 4, may be used simultaneously in a given system.

The second system configuration may be particularly advantageous when at least three electrochemical couples, which have complementary colors, in the oxidized or reduced forms, which are produced simultaneously when the system is switched, are associated with a group of adjacent cells. This is because this group of cells then appears, macroscopically, as an element of the area of the system that switches between a high-light-transmission state and a low-light-transmission state, these two states possibly having neutral colors. The dimensions of each group of cells may then be selected depending on the distance between a viewer and the electroactive system.

In the various cases where the salt bridge is impermeable to the first and second electroactive species, the recombination of the species after coloration is completely prevented. The system thus formed is bistable. The bleaching is obtained by applying an opposite voltage or current.

It is understood that the invention may be employed with modifications to the system relative to the embodiments which were described in detail above, while preserving at least some of the advantages mentioned. In particular, the dimensions and the materials of certain elements may be adapted to each application, and the patterns of the electrodes which are shown in FIGS. 3a, 3b, 4a and 4b may be modified.

Furthermore, the invention may be employed to produce electroactive systems other than electrochromic systems.

The invention claimed is:

1. A transparent electroactive system, that allows clear vision through said system, comprising:
    external walls defining a closed volume, the system being transparent for a direction of sight passing through the external walls and said closed volume between two opposite sides;
    a liquid and/or a gel contained in the closed volume;
    two transparent electrodes, in contact with said liquid or gel on electron transfer surfaces, and intended to be respectively connected to two terminals of a variable power supply;
    first and second electroactive substances distributed in the liquid or gel, with different respective redox potentials, at least some of the first and second electroactive substances having an optical effect variable between an oxidized form and a reduced form of said substances,
wherein the two electrodes are borne by a same one of the two external walls, being juxtaposed parallel to said external wall on a same one of the sides of the closed volume containing the liquid or gel, with a separation distance between said electrodes of less than 250 µm,
and in that the system furthermore comprises a barrier extending between the two electrodes, to a height of between 1 and 20 µm towards the interior of the closed volume, said height being measured from a mean level of the electron transfer surfaces of the two electrodes.

2. The system as claimed in claim 1, in which the height of the barrier is greater than or equal to 5 µm, beyond the mean level of the electron transfer surfaces of the two electrodes.

3. The system as claimed in claim 1, wherein in which the distance separating the two electrodes is less than 100 µm, preferably between 1 and 40 µm.

4. The system as claimed in claim 1, in which the barrier is based on at least one organic, inorganic or hybrid material, or on a photoresist.

5. The system as claimed in any one of claims 1, 2, 3 and 4, furthermore comprising a network of internal walls partitioning the closed volume into cells juxtaposed parallel to the external walls, and in which at least one of the two electrodes is in contact with the liquid or gel contained in each cell.

6. The system as claimed in claim 5, in which the internal walls each have a height greater than or equal to the height of the barrier, preferably between 15 µm and 25 µm, perpendicular to the external walls.

7. The system as claimed in claim 5, in which, for at least some of the cells, the two electrodes are each in contact with the liquid or gel contained in each cell, with a portion of the barrier placed in said cell between the two electrodes, and the liquid or gel contained in said cell containing both the first and second electroactive substances.

8. The system as claimed in claim 5, in which, for at least some of the cells, only one of the two electrodes is in contact with the liquid or gel contained in each cell, a first of said cells, which is powered by one of the electrodes, being adjacent a second of said cells, which is powered by the other electrode, with a salt bridge between the two cells, and the internal wall separating said first and second cells forming a portion of the barrier between the two electrodes.

9. The system as claimed in claim 8, in which the salt bridge is impermeable to the first and second electroactive substances.

10. The system as claimed in claim 8, in which the salt bridge consists of a film of a gel or a membrane placed on the tops of the internal walls, on the side opposite the electrodes.

11. The system as claimed in claim 1, in which the first and second electroactive substances each have an optical effect variable between the oxidized form and the reduced form of said substances.

12. The system as claimed in claim 11, in which the first and second electroactive substances have respective colors, in at least one of the oxidized or reduced forms, which are complementary relative to said forms, so that said colors appear simultaneously when the system is operated.

13. The system as claimed in claim 12, in which the two electrodes are alternated, with a pitch of less than 1 mm, parallel to the external wall bearing said two electrodes.

14. The system as claimed in claim 1, in which the first or second electroactive substances have optical effect variable between the oxidized form and the reduced form of said substances, the others of said first and second substances not having optical effect variable between the oxidized form and the reduced form of said other substances, and in which one of the electrodes dedicated to transferring electrons to those of the substances that do not have variable optical effect, has a smaller electron transfer surface than the other electrode dedicated to transferring electrons to those of the substances that have the variable optical effect.

15. The system as claimed in claim 1, furthermore comprising a strip of a transparent and insulating material, placed between the two electrodes, with respective thicknesses of said electrodes and of said strip being designed to produce respective phase delays which are equal for a wave of visible light propagating at right angles to the electron transfer surfaces of the electrodes.

16. The system as claimed in claim 1, furthermore comprising an amount of a substance that is absorbing for a part at least of the visible light, placed between the two electrodes.

17. The system as claimed in claim 16, in which the absorbing substance is black.

18. The system as claimed in claim 16, in which the absorbing substance comprises at least one dye diffused in the external wall which bears the electrodes, on the side of and between said electrodes.

19. The system as claimed in claim 1, in which the electrodes have irregular contours, parallel to the external walls.

20. The system as claimed in claim 19, in which the contours of the electrodes have two-dimensional irregularities, parallel to the external walls.

21. The system as claimed in claim 1, forming a glazing pane, an ophthalmic spectacle lens, a helmet visor or a mask lens.

* * * * *